(12) United States Patent
LiVecchi et al.

(10) Patent No.: US 7,954,138 B2
(45) Date of Patent: May 31, 2011

(54) METHOD AND SYSTEM FOR MULTIPLEXING MULTIPLE LEVEL SECURITY SERVER APPLICATIONS ON THE SAME INTERNET ADDRESS AND PORT

(75) Inventors: Patrick Michael LiVecchi, Willow Spring, NC (US); Scott Christopher Moonen, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 11/840,210

(22) Filed: Aug. 16, 2007

(65) Prior Publication Data
US 2009/0049523 A1 Feb. 19, 2009

(51) Int. Cl.
*G06F 7/04* (2006.01)
*G06F 15/16* (2006.01)
*G06F 17/30* (2006.01)

(52) U.S. Cl. .............................................. 726/4; 726/3

(58) Field of Classification Search .................... 726/3, 4
See application file for complete search history.

(56) References Cited

U.S. PATENT DOCUMENTS

| | | | |
|---|---|---|---|
| 5,784,560 A | 7/1998 | Kingdon et al. | |
| 6,363,081 B1 * | 3/2002 | Gase | 370/466 |
| 2005/0097357 A1 * | 5/2005 | Smith | 713/201 |
| 2006/0074937 A1 | 4/2006 | Bird et al. | |

OTHER PUBLICATIONS

"Comparing the Multilevel Security Policies of the Solaris Trusted Extensions and Red Hat Enterprise Linux Systems"; Glenn Faden, Feb. 2007 ([http://www.sun.com/bigadmin/features/hub_articles/mls_trusted_exts.jsp].

United States Patent and Trademark Office, Office Action for U.S. Appl. No. 11/840,212, Sep. 29, 2010, pp. 1-13, Alexandria, VA, USA.

* cited by examiner

*Primary Examiner* — Kambiz Zand
*Assistant Examiner* — Aubrey H Wyszynski
(74) *Attorney, Agent, or Firm* — Lee Law, PLLC; Christopher B. Lee

(57) ABSTRACT

The invention provides a system and method for sharing (or "multiplexing") of the same internet (IP) address/port by multiple instances of multiple level security and/or single level security (SLS) server applications (each of which is used for processing one or more client request(s) falling within a range of security labels or other security attribute(s)) where the client processing request is directed to the system server capable of processing the request using the identified security label.

14 Claims, 3 Drawing Sheets

METHOD AND SYSTEM FOR MULTIPLEXING MULTIPLE LEVEL SECURITY SERVER APPLICATIONS ON THE SAME INTERNET ADDRESS AND PORT

TECHNICAL FIELD

The invention relates to use of secure server applications on computer networks (including the internet).

BACKGROUND

A multi-level computer security system often identifies authorized system users as well as "user agents" and other computer system hardware and/or software resources using "security tags" (or "security labels") comprised of information access restrictions that can be organized into a data tuple (or similar data structure) containing the fields <security domain, security level, categories>. (See e.g., "*Federal Information Processing Standards Publication* 188"; 1994 Sep. 6, "Announcing the Standard for Standard Security Label for Information Transfer".) The "security domain" describes the domain of interpretation of the "security level" and "categories" values, while the "security level" identifies the restricted access (classification) level of a user or computer resource (e.g., "UNCLASSIFIED"/"CONFIDENTIAL"/"SECRET"/"TOP SECRET") ordered according to increasing (or decreasing) security level values indicating more (or less) restrictive access for a given item of information (respectively), and the "categories" (a set of zero or more) identify additional non-hierarchical restrictions or characteristics applicable to a user or resource (e.g., membership in an organization or department such as DOD, DOE, NSA). The multi-level "security label" is a special case of a generalized "security descriptor" (which may be a single value such as a "security level" or which may consist of multiple such "security attributes") that is used to identify users and resources and determine appropriate use.

Two (or more) security labels are "equivalent" if they have the same "security tag" providing the same <security domain, security level, categories> restrictions, while security label "A" is said to "dominate" security label "B" in the same security domain if (1) the security level for "A" is equal to or higher than that of "B" and (2) all of the category restrictions identified for B are contained in (or are a subset of) the categories for A (where a given individual security label necessarily is equivalent to and/or dominates itself). A "range" of security labels from A to B may be defined if B dominates A (or vice versa) such that any security label "X" will fall within the range if it dominates security label "A" and is in turn dominated by security label "B" (or vice versa). In the generalized case, security descriptors can be defined to have a range.

SUMMARY OF THE INVENTION

The invention provides a system and method for simultaneous sharing (or "multiplexing") of the same network/internet (IP) address/port by multiple instances of a single (SLS) or multiple level security server application (each of which is exclusively used for processing one or more client request(s) falling within a unique range of security labels or other security attribute(s)) where the client message is directed to the system server capable of processing the request with a security label equivalent to that of the client. The invention allows the use of multiple level security and/or SLS server applications without requiring a different network/internet (TCP/IP) address and/or port for each different server security label (while also being configured for use with persistent servers). This invention thus allows the administrative separation of multiple level security and/or SLS server applications in a multi-level security environment (1) without incurring the cost of reprogramming or reconfiguring all software applications for multi-level security support and (2) without incurring the administrative cost of provisioning a different TCP/IP address (or non-standard port) for each different security label.

The present invention provides a system and method for multiplexing of a single network address by multiple instances of a secure server application, each of which is used for processing one or more client request(s) falling within a range of security labels or other security attribute(s).

The present invention provides for the use of secure server applications without requiring a different network/internet address/port for each different server security label.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

DETAILED DESCRIPTION OF THE PREFERRED EMBODIMENTS

Figure 1:
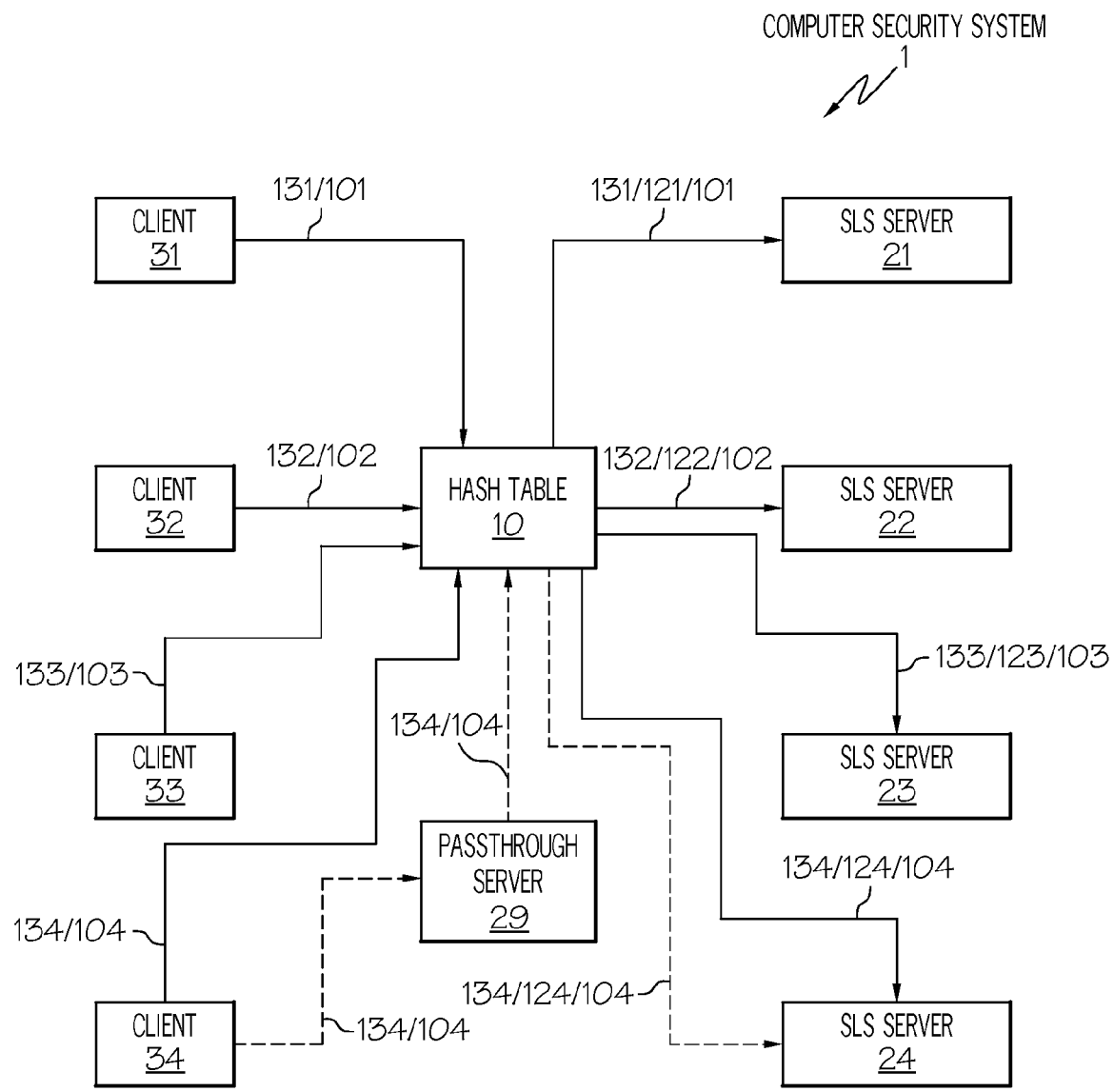
FIGS. 1 & 2 illustrate diagrams outlining operation of a multi-level computer security system according to the invention.

A multi-level computer security system has many authentication and authorization features and functions that are designed and configured to prevent "write-down" (or declassification) of data (occurring through access by unauthorized system users and/or resources at lower security levels or with incompatible security categories) which requires that (1) users and user agents can only provide (or "write") data to users, agents or other system resources having a dominating (equivalent or higher) security label; and (2) users and user agents may only access (or "read") data from users, agents or other system resources having a dominated (equivalent or lower) security label. Since computer network (including internet) client/server communications generally involve both "reading" and "writing" of data, both client and server must have equivalent security labels (or security descriptors) in order to operate together in a configuration that prevents "write-down" declassification of the data exchanged between them.

Many existing computer network and/or internet communication protocols generally prevent multiple servers from using the same network/internet address and port connection at the same time (except for load balancing purposes and without regard to security label.) As a result, when a secure server application cannot be made to support multi-level security, then a new internet address and/or port must be allocated for every separate instance of a secure server application operating with a single security label, in turn requiring a large number of addresses and/or ports if many user security labels must be supported for a given application (which creates unwieldy configuration complexity).

FIGS. 1-2 & 3-4 respectively illustrate diagrams and flowcharts outlining operation of a multi-level computer security system 1 according to a preferred embodiment of the invention, where a data storage or processing hardware and/or software container resource (e.g., a computer file/database or disk drive directory or an internet protocol (IP) address) may be configured to allow access to information falling within a range of potential security labels. When a discrete resource is accessed or created (i.e., "instantiated") from within (or using) a given container (e.g., opening a file or software application program or establishing a transmission control protocol (TCP) connection using an IP address or sending a user datagram protocol (UDP) message using a TCP/IP address and port connection) that resource will inherit the security label of the user or agent creating it and it must contain or use data that falls within the range of security attributes allowed for storage or processing in that container (i.e., 101 and/or 102 and/or 103 and/or 104 respectively corresponding to "UNCLASSIFIED—PUBLIC"/"CONFIDENTIAL—NSA"/"SECRET—NSA"/"TOP SECRET—NSA", etc.).

Similarly in certain multi-level security implementations, a generic server (or "daemon") software application program may be identified as a processing resource "container" 20 of the software "user agents" it creates and therefore may be configured to operate with a defined set of potential security attributes 100 when instantiating "user agent(s)" for carrying out the processing function(s) requested by one or more system user(s), which must also inherit the security label of the user (or other agent) initiating the transaction that falls within the range of security labels permitted to be accessed on the server (when a user request or transaction is executed by that server). A server application permitted to use such a range of potential security labels may communicate via (or "bind to") a TCP/IP address/port that is associated with the same range if the system properly identifies (or "tags") the security label 130 of a network client 30 making a processing request to that server 20 and if the server has a consistent (i.e., equivalent or dominating) security label 120 so it can validly "assume" the restrictions contained in the client security label in order to service a processing transaction for that client.

However, it may be costly (or impossible) to modify (or "retrofit") an existing server software application to correctly identify and assume the security label of every potential client capable of making a processing request, so in that case the server must operate using one specific security label (i.e., as a single level security (SLS) application) such that it is only permitted to provide processing service(s) to client(s) having an equivalent security label. As a result, additional (duplicate) instances of the processing function(s) for that server application (21 or 22 or 23 or 24) must be initiated (or "launched") to provide service to multiple clients (31 or 32 or 33 or 34) having security labels (131 or 132 or 133 or 134) with different security levels and/or categories and/or other attributes (101 or 102 or 103 or 104 respectively).

When a system server can be implemented in the form of a single reusable software process, then a "passthrough" server application (e.g., UNIX inetd) may be implemented to support a range of client security labels by using a single TCP/IP address/port that allows access to a range of server security labels. In that case, the "passthrough server" 29 accepts a client request 34 (by identifying and assuming the security label for that client 134) and then launches (or "spawns") an instance of the particular SLS server application 24 capable of carrying out the client processing request with an equivalent security label 124. (This approach is supported by IBM z/OS Communications Server®) However, this solution has the disadvantage that it may not be used for any application requiring the server to continue operating (i.e., "persist") across multiple processing transactions (e.g., a database server). This solution may also be less efficient than processing client requests using program subroutines (or "threads") contained within pre-initialized software.

Figure 2:
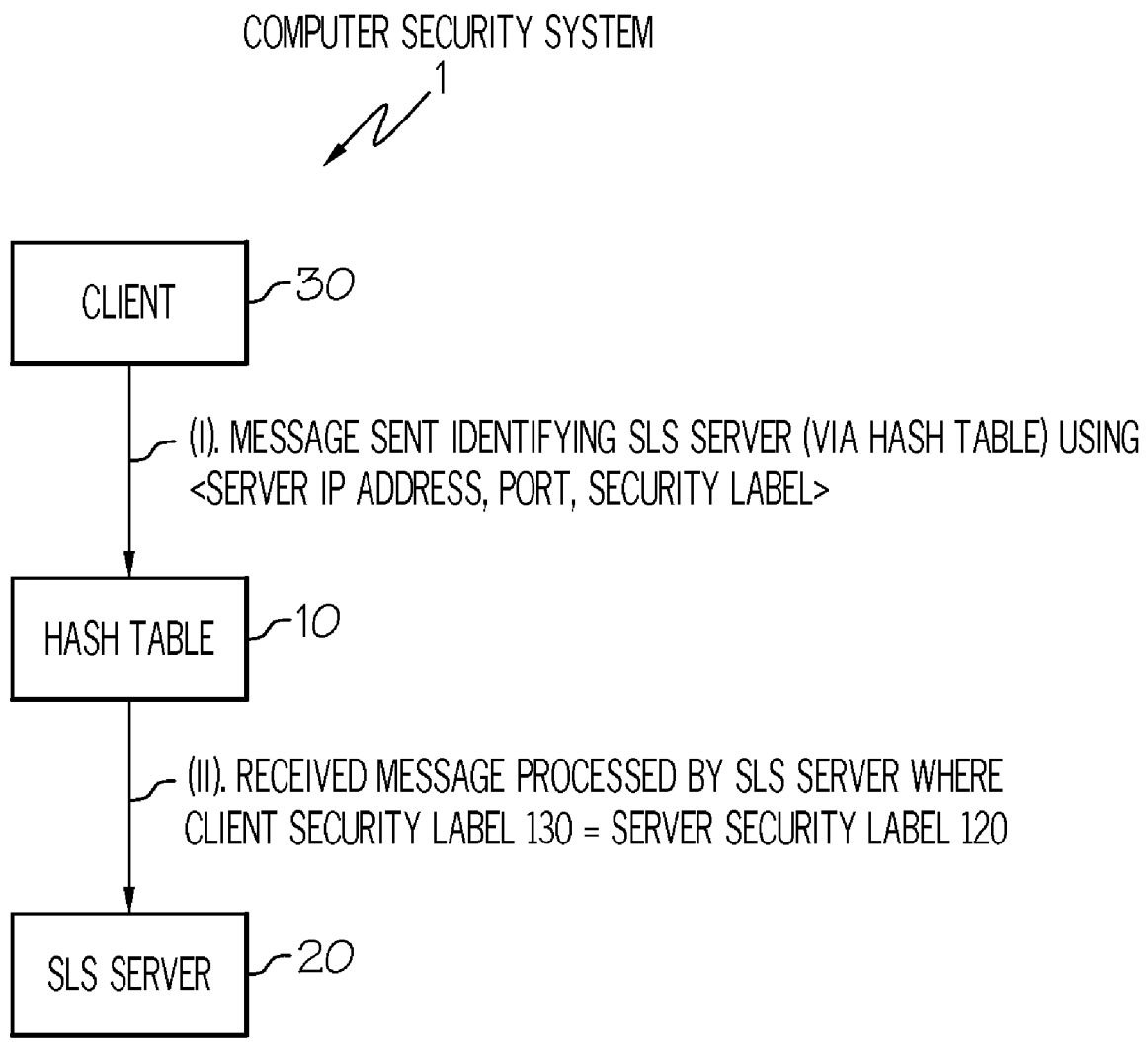
Figure 3:
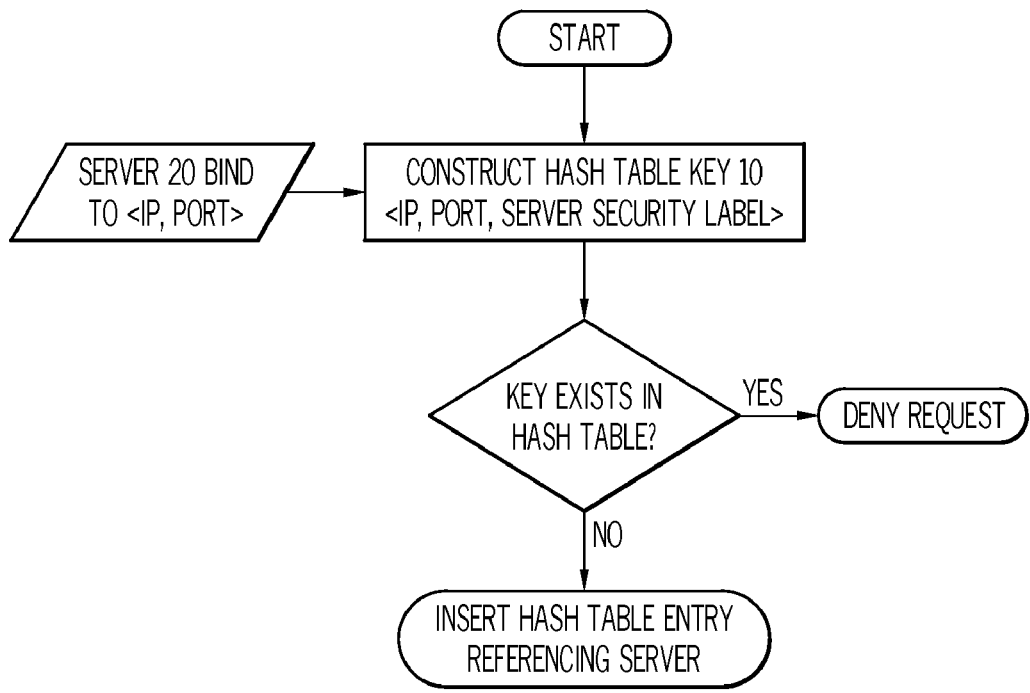
FIGS. 3 & 4 illustrate flowcharts outlining operation of a multi-level computer security system according to the invention.
Figure 4:
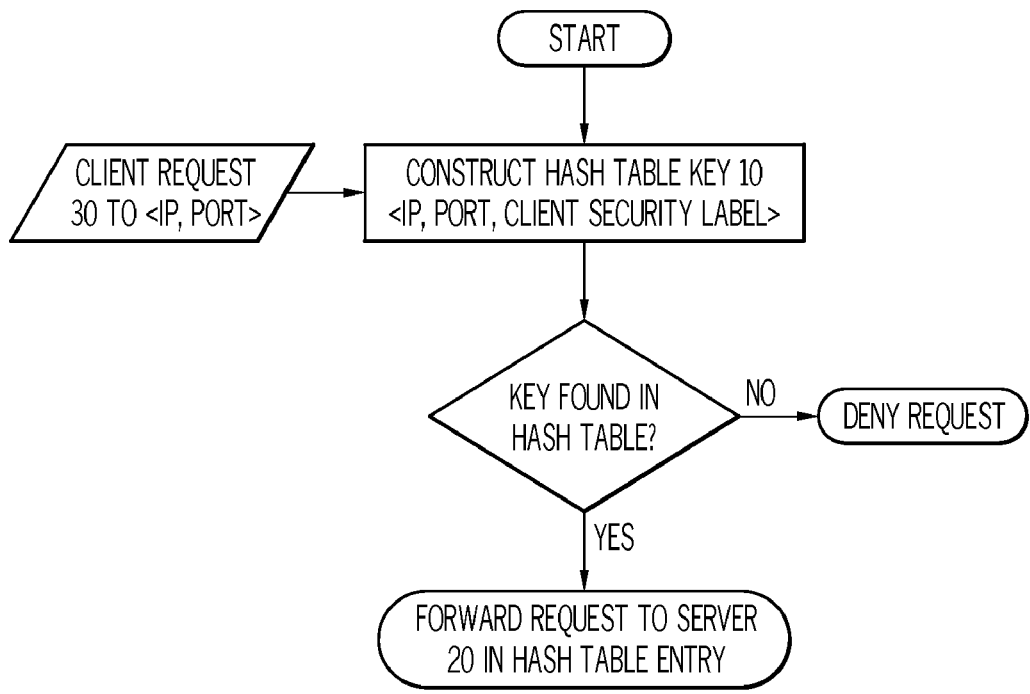

As shown in FIGS. 1 & 2, many network/internet communication protocol (including TCP/IP) implementations employ a data structure such as a "hash table" 10 to link (or "map") the identification of an operating server application 20 to the associated network/internet (TCP/IP) address(es)/port(s) used by that server in communicating with network client(s) 30. As shown in FIGS. 3 & 4 respectively illustrating the "binding" of a server 20 and the processing of a given client request 30, the "hash table" 10 is consulted to determine the network/internet location of the server 20 (corresponding to the TCP/IP address/port contained in the request). As shown in FIG. 2 at step (i), a preferred embodiment of the invention extends the "hash table lookup" to include an identification of the security label as well as the TCP/IP address/port identified in the client request so that (conceptually) the "hash table key" 10 used in identifying the appropriate server 20 for processing the client request 30 now consists of <IP address, port, security label> rather than <IP address, port>. As shown in FIG. 2 at step (ii), this "hash table key" configuration allows the security system 1 to permit multiple (persistent) SLS server applications 20 (i.e., 21 and/or 22 and/or 23 and/or 24) to use the same TCP/IP address and/or port if they are operating with different security labels 120 (i.e., 121 or 122 or 123 or 124 respectively) so that a client processing request 30 is routed to the server(s) capable of assuming the security label 130 (i.e., 131 or 132 or 133 or 134) that the client provided in the request.

In addition to expanding the "hash table key" to include client security label (as described above) the representation of different server application(s) in the hash table may be converted to an "anchor structure" that identifies a list (in the form of a "chain") of server instances using a single (i.e., the same) TCP/IP address and port (where each server is associated with a different security label). Other known data structures may be used to achieve the same purpose. In particular, alternative security descriptors may be created that are broader than the multi-level security label described herein (e.g., having additional attributes) or narrower (e.g., consisting only of a security level attribute) for which it remains possible to define permitted ranges or sets of security descriptors.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A computer system, comprising:
    at least one secure server operating a plurality of instances of a secure server application, each instance mapped to one of a plurality of different ranges of security attribute(s) and using a single provisioned shared network address and port, and configured for receiving and processing one or more client messages, each client message comprising client security attribute(s) and routed via the single provisioned shared network address and port and the client security attribute(s) to the secure server mapped to the one of the plurality of different ranges of security attribute(s) identified via the client security attribute(s) for each client message.

2. The computer system of claim 1, wherein at least one client message inherits a client security label and comprises data falling within a range of security levels associated with the plurality of different ranges of security attribute(s) and processed by one of the plurality of instances of the secure server application.

3. The computer system of claim 2, wherein the at least one of the plurality of instances of the secure server application communicates with a client via the single provisioned shared network address and port using an equivalent security label as the at least one of the plurality of instances of the secure server application.

4. The computer system of claim 3, wherein the at least one of the plurality of instances of the secure server application operates at a single security level to process client message(s) comprising the equivalent security label.

5. The computer system of claim 1, wherein each of the plurality of instances of the secure server application are initiated with at least one security label within a specified range to process multiple client messages each comprising a security label in the specified range.

6. The computer system of claim 1, wherein a data table is used to identify each of the plurality of instances of the secure server application by the single provisioned shared network address and port and at least one security label falling within a range of security labels.

7. The computer system of claim 6, wherein the data table is formatted in an anchor data structure that identifies a chain list of the plurality of instances of the secure server application each using the same single provisioned shared network address and port such that each of the plurality of instances of the secure server application is associated with a different security label falling within the range of security labels.

8. A method, comprising:
configuring at least one secure server operating a plurality of instances of a secure server application, each instance mapped to one of a plurality of different ranges of security attribute(s) and using a single provisioned shared network address and port, for receiving and processing one or more client messages, each client message comprising client security attribute(s) and routed via the single provisioned shared network address and port and the client security attribute(s) to the secure server mapped to the one of the plurality of different ranges of security attribute(s) identified via the client security attribute(s) for each client message.

9. The method of claim 8, wherein at least one client message inherits a client security label and comprises data falling within a range of security levels associated with the plurality of different ranges of security attribute(s) and processed by one of the plurality of instances of the secure server application.

10. The method of claim 9, wherein the at least one of the plurality of instances of the secure server application communicates with a client via the single provisioned shared network address and port using an equivalent security label as the at least one of the plurality of instances of the secure server application.

11. The method of claim 10, wherein the at least one of the plurality of instances of the secure server application operates at a single security level to process client message(s) comprising the equivalent security label.

12. The method of claim 8, wherein each of the plurality of instances of the secure server application are initiated with at least one security label within a specified range to process multiple client messages each comprising a security label in the specified range.

13. The method of claim 8, wherein a data table is used to identify each of the plurality of instances of the secure server application by the single provisioned shared network address and port and at least one security label falling within a range of security labels.

14. The method of claim 13, wherein the data table is formatted in an anchor data structure that identifies a chain list of the plurality of instances of the secure server application each using the same single provisioned shared network address and port such that each of the plurality of instances of the secure server application is associated with a different security label falling within the range of security labels.

* * * * *